US011080165B1

(12) United States Patent
Allen et al.

(10) Patent No.: US 11,080,165 B1
(45) Date of Patent: Aug. 3, 2021

(54) HIERARCHICAL PERFORMANCE INSTRUMENTATION INJECTION

(71) Applicant: Amazon Technologies, Inc., Seattle, WA (US)

(72) Inventors: Nicholas A. Allen, Kirkland, WA (US); Raleigh H. Upshur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/673,141

(22) Filed: Aug. 9, 2017

Related U.S. Application Data (63) Continuation of application No. 13/107,010, filed on May 13, 2011, now abandoned.

(51) Int. Cl.
    *G06F 15/177*     (2006.01)
    *G06F 11/36*     (2006.01)

(52) U.S. Cl.
    CPC ............... *G06F 11/3636* (2013.01)

(58) Field of Classification Search
CPC .... G06F 11/3636; G06F 36/36; G06F 15/177; G06F 21/00; G06F 3/048; G06F 3/0484; G06F 9/452; G06F 3/0481; H04L 29/0872; H04L 67/1002; H04L 67/1091; H04L 67/42; H04L 29/06047; H04L 29/08162; H04L 29/08225; H04L 63/0884; H04L 63/126; H04L 67/148; H04L 12/12; H04L 63/08; H04L 43/0864; H04L 65/1006; H04L 63/0853; G06Q 30/0641; G06Q 10/087; G06Q 30/06; G06Q 10/08; G06Q 10/101; H04W 4/33; H04W 4/35

USPC ................ 709/203, 208; 707/770; 711/147; 712/28
See application file for complete search history.

(56) References Cited

U.S. PATENT DOCUMENTS

| | | | |
|---|---|---|---|
| 6,483,813 B1 * | 11/2002 | Blencowe | G06F 11/3419 370/252 |
| 7,000,199 B2 | 2/2006 | Steele et al. | |
| 7,451,455 B1 | 11/2008 | El-Haj | |
| 8,266,281 B1 * | 9/2012 | Carlson | H04L 43/0876 709/224 |
| 2002/0180738 A1 * | 12/2002 | Shibata | G06F 16/9577 345/473 |
| 2003/0100964 A1 * | 5/2003 | Kluge | G05B 19/042 700/83 |

(Continued)

OTHER PUBLICATIONS

Office action for U.S. Appl. No. 13/107,010, dated Feb. 9, 2017, Allen et al., "Hierarchical Performance Instrumentation Injection", 35 pages.

(Continued)

*Primary Examiner* — Tonia L Dollinger
*Assistant Examiner* — Mehulkumar J Shah
(74) *Attorney, Agent, or Firm* — Lee & Hayes, P.C.

(57) ABSTRACT

In certain embodiments, a system receives a computer program from a server. The computer program can initiate display of views. The system selects one or more views according to a hierarchy of parent-child relationships among the views. For each selected view, a controller associated with rendering of the view is identified. One or more timing thunks configured to collect timing events are installed into the controllers. One or more records are created from the timing events, and at least a subset of the records are reported to the server.

20 Claims, 3 Drawing Sheets

(56) References Cited

U.S. PATENT DOCUMENTS

| | | | |
|---|---|---|---|
| 2004/0133848 A1* | 7/2004 | Hunt | G06F 16/9577 715/273 |
| 2004/0133898 A1 | 7/2004 | Cherdron et al. | |
| 2005/0114563 A1 | 5/2005 | Brelin et al. | |
| 2007/0002185 A1* | 1/2007 | Lee | G06T 15/00 348/731 |
| 2007/0271375 A1* | 11/2007 | Hwang | G06F 11/3419 709/224 |
| 2008/0059940 A1* | 3/2008 | Matic | G06F 8/00 717/100 |
| 2008/0189281 A1* | 8/2008 | Cancel | G06Q 30/02 |
| 2008/0208361 A1 | 8/2008 | Grgic | |
| 2009/0013034 A1 | 1/2009 | Cheng et al. | |
| 2009/0055769 A1* | 2/2009 | Ding | G06F 16/9027 715/804 |
| 2009/0199113 A1* | 8/2009 | McWhinnie | G06Q 10/06 715/762 |
| 2009/0271386 A1* | 10/2009 | Milov | G06F 9/451 |
| 2009/0282022 A1* | 11/2009 | Bennett | G06F 3/0482 |
| 2010/0269152 A1* | 10/2010 | Pahlavan | H04L 63/0884 726/3 |
| 2010/0325544 A1 | 12/2010 | Alhadeff et al. | |
| 2010/0333072 A1 | 12/2010 | Dulip et al. | |
| 2011/0252299 A1 | 10/2011 | Lloyd et al. | |
| 2011/0252312 A1* | 10/2011 | Lemonik | G06F 17/248 715/255 |

OTHER PUBLICATIONS

Office action for U.S. Appl. No. 13/107,010, dated Jun. 28, 2016, Allen et al., "Hierarchical Performance Instrumentation Injection", 34 pages.

* cited by examiner

HIERARCHICAL PERFORMANCE INSTRUMENTATION INJECTION

CROSS-REFERENCE TO RELATED APPLICATIONS

This patent application is a continuation application of, and claims priority to, co-pending, commonly-owned U.S. patent application Ser. No. 13/107,010, entitled, "HIERARCHICAL PERFORMANCE INSTRUMENTATION INJECTION", filed on May 13, 2011, which is incorporated herein by reference in its entirety.

BACKGROUND

In certain situations, software developers may assess the quality of a computer program by measuring performance metrics of the program. For example, a developer may want to measure the time to interactivity of a web application. The time to interactivity may indicate the time it takes for a user to be able to interact with a view of the web application. The developer may measure the time to interactivity to determine ways to improve the time to interactivity of the web application.

DESCRIPTION OF EXAMPLE EMBODIMENTS

In certain situations, a software developer may want to measure the time to interactivity of a computer program. The time to interactivity may indicate the time it takes for a user to be able to interact with a view of a computer program. A developer may measure the time to interactivity in order to determine ways to improve the time to interactivity.

In certain web applications, the web browser of a client system executes logic to display views of the application. Because execution is at the client system, the client system measures performance metrics. Known techniques where the client system measures performance metrics, however, may have problems. According to certain known techniques, the performance metrics are obtained from a test client system in a controlled environment. The performance metrics apply only to the particular test client system in the particular controlled environment. In real-life situations, however, client systems and environments vary widely. According to other known techniques, developers may insert stopwatch reporting code into a computer program that is sent to a client system. The stopwatch reporting code sends performance metrics from the client system. It may be difficult, however, to determine where to put the stopwatch reporting code into the computer program. Moreover, licensing and/or deployment restrictions may prevent modification of the computer program.

Certain embodiments may allow the client system insert reporting thunks into a computer program. When the part of the computer program with a reporting thunk is executed, the reporting thunk generates a reporting event that may be sent to a server system. A reporting thunk may be attached to the computer program rather than directly to a view of the program. In certain embodiments, the client system dynamically determines where to insert the thunks and/or the type of thunks to insert.

In certain embodiments, a system comprises one or more interfaces operable to receive a computer program from a server. The computer program can initiate display of views. The system comprises one or more processing units operable to select one or more views according to a hierarchy of parent-child relationships among the views. For each selected view, a controller associated with rendering of the view is identified. One or more timing thunks configured to collect timing events are installed into the identified controllers. One or more records are created from the timing events, and at least a subset of the records are reported to the server.

In certain embodiments, a computer program operable to initiate display of views is received. One or more views are selected according to a hierarchy of parent-child relationships among the views. For each selected view, a controller associated with rendering the view is identified. One or more timing thunks configured to collect timing events are installed into the identified controllers.

In certain embodiments, timing records are received from a client. The timing records are generated by one or more timing thunks of one or more controllers of one or more views. Elapsed times are extracted from the timing records. An elapsed time of a view indicates a time to interactivity of the view. One or more of the elapsed times are adjusted to yield adjusted elapsed times.

Figure 1:
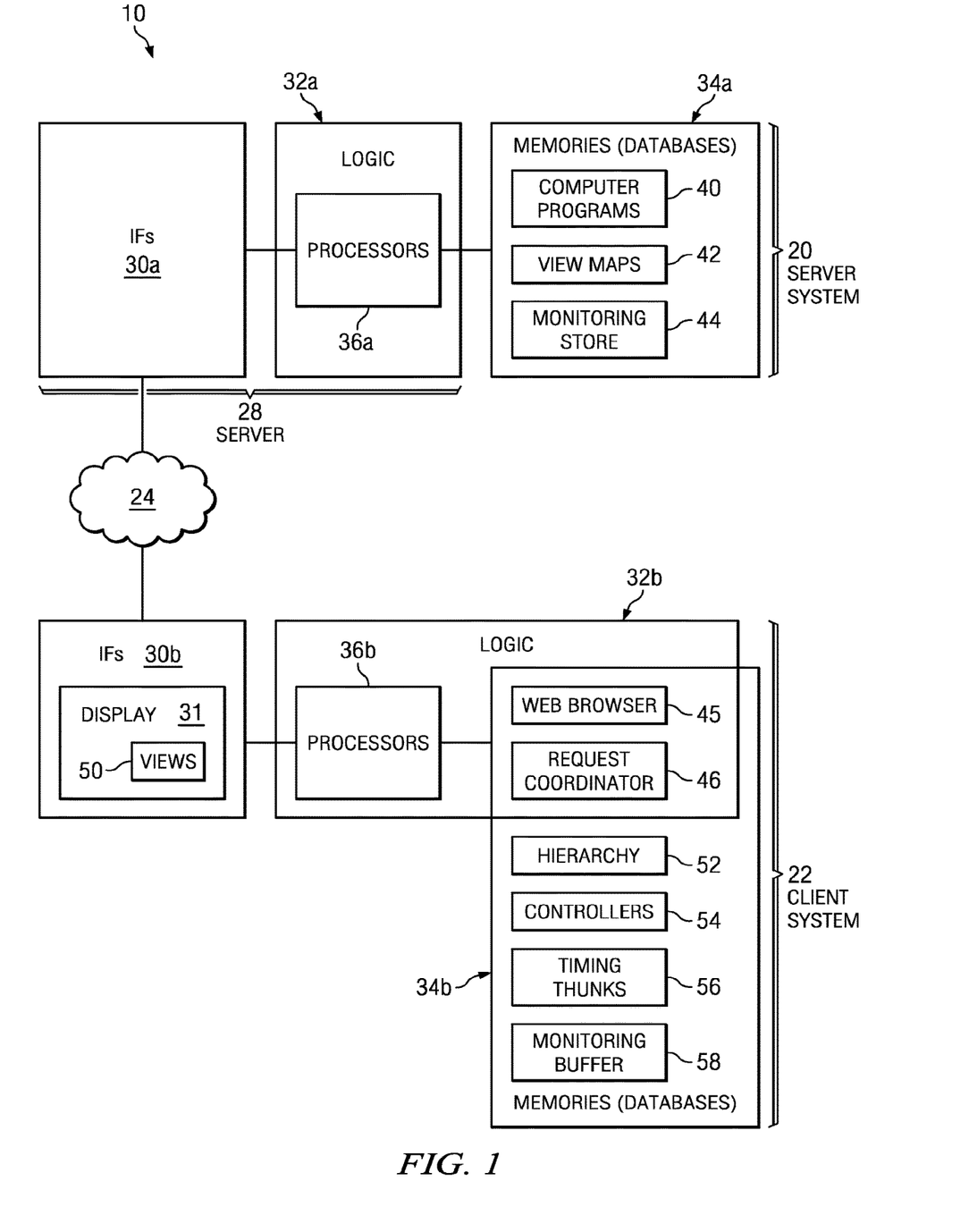
FIG. 1 illustrates an example of a system that includes a client system that can provide timing records to a server system.

FIG. 1 illustrates an example of a system that includes a client system that can provide timing records to a server system. In the illustrated example, system 10 includes a server system 20 coupled to a client system 22 through one or more communication networks 24. Server system 20 and client system 22 may each include one or more interfaces 30 (30a-b), logic 32 (32a-b), and one or more memories (such as databases) 34 (34a-b). Logic 32 (32a-b) may include one or more processors 36 (36a-b).

In certain embodiments, server system 20 may include one or more servers 28 with interfaces 30a and logic 32a. Memories 34a of server system 20 may store computer programs 40, view maps 42, and a monitoring store 44. In certain embodiments, interfaces 30b of client system 22 may include a display 31 that can display views 50. Logic 32b of client system 22 includes one or more processors 36b and applications such as a web browser 45 and a request coordinator 46. Memories 34b of client system 22 may store a hierarchy 52, controllers 54, timing thunks 56, and a monitoring buffer 58.

Server system 20 may provide resources (such as a service and/or content) to client system 22. For example, server system 20 may provide a web application to client system 22. In certain embodiments, the resource may be provided in response to a request from client system 22. Server system and client system 22 may each include one or more computing systems that include interfaces 30, logic 32, and one or more memories 34 that perform the operations of server system and client system 22.

A computer program 40 (or a software program) is a sequence of instructions that perform a specified task for a computer. In certain embodiments, a computer program 40 initiates display of a view 50. A view 50 draws one or more graphical elements of any suitable size or shape. Certain graphical elements (e.g., buttons, boxes, and menus) may be selected by user in order to initiate an action. Certain graphical elements (e.g., windows and text fields) may display data or accept user input. In certain embodiments, a computer program 40 initiates display of a view 50 at display 31 of client system 22. Display 31 may be any suitable user interface such as a graphical user interface (GUI).

Views 50 and controllers 54 may be part of a model-view-controller (MVC) software architecture. A model may manage the behavior and data of the application domain, respond to requests (e.g., from a view 50) for information about its state, and/or respond to instructions (e.g., from a controller 54) to change state. In certain examples, the model notifies observers (e.g., views 50) when information changes so that they can react. A view 50 renders the model into a form suitable for interaction, typically a user interface element. A controller 54 receives user input and initiates a response by making calls on model objects. A controller 54 accepts input from the user and instructs the model and view 50 to perform actions based on that input.

Figure 2:
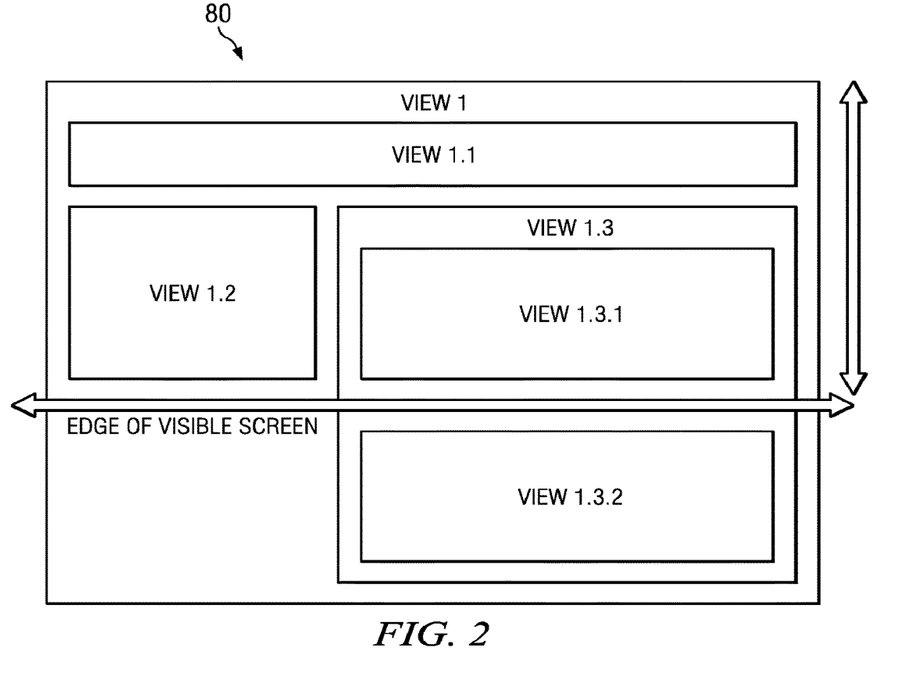
FIG. 2 illustrates an example of views that may be displayed by the client system of FIG. 1.

FIG. 2 illustrates an example of views 80. A first view 80 may contain one or more second views 80. For example, a first view 80 may contain a second view 80 if the area of the first view 80 includes some or all of the area of the second view 80. For example, View 1 includes Views 1.1, 1.2, and 1.3. View 1.3 includes Views 1.3.1 and 1.3.2.

In certain embodiments, one or more views might be initially displayed (and visible to a user), and one or more other views might not be initially displayed (and not visible to a user). In the example, View 1.3.2 is not initially displayed. To display a view that is not initially displayed, a user may scroll to display the view. In the example, a user may scroll down to display View 1.3.2.

Referring back to FIG. 1, a hierarchy 52 may describe parent-child relationships among views 50. In certain embodiments, the first view that contains a second view may be regarded as the parent of the second view, and the second view may be regarded as a child of the first view. A hierarchy 52 may indicate the relationships between views 50 and controllers 54 responsible for rendering the views 50.

Figure 3:
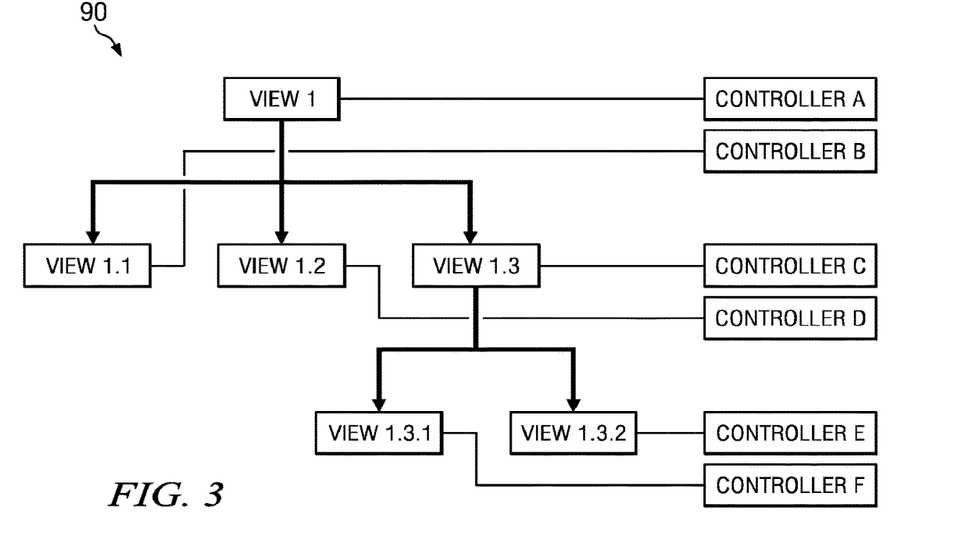
FIG. 3 illustrates an example of a hierarchy of views that may be used by the client system of FIG. 1.

FIG. 3 illustrates an example of a hierarchy 90 of the views 80 of FIG. 2. In the example, View 1 is shown as a parent of Views 1.1, 1.2, and 1.3. View 1.3 is shown as a parent of Views 1.3.1 and 1.3.2. View 1 is controlled by Controller A; View 1.1 is controlled by Controller B; View 1.2 is controlled by Controller D; View 1.3 is controlled by Controller C; View 1.3.1 is controlled by Controller F; and View 1.3.2 is controlled by Controller E.

Referring back to FIG. 1, request coordinator 46 inserts reporting thunks that generate reporting events into a computer program. In certain embodiments, request coordinator 46 receives a computer program operable to initiate display of views 50 and selects views 50 according to hierarchy 52 of parent-child relationships among views 50. For each view 50, request coordinator 46 identifies a controller 54 associated with rendering the view 50 and installs one or more reporting thunks into controller 54. In certain embodiments, request coordinator 46 may be provided to client system 22 by server system 20.

In certain embodiments, a reporting thunk may be a timing thunk 56 that generates timing records that include timing information. In certain embodiments, timing information may indicate a time to interactivity measuring the time between when a user requests a view 80 and when view 80 is operable to have the user interact with the view 80, when view 80 is interactivable. For example, a time to interactivity may be an elapsed time from a start time to a stop time. The start time may correspond to when the user provides user input indicating that the user is requesting an action. The user input may be any suitable input that can be used to select an action. For example, the input may be provided by the user interacting with an input device such as a keyboard, a mouse, a touch screen, a microphone, or any other interface that the user may use to select the action. The stop time corresponds to when view 80 is sufficiently rendered such that the user can interact with view 80. For example, the stop time may be when a call is made to controller 54 that renders view 80. In certain embodiments, timing information may include a start time, a stop time, and/or the elapsed time, and/or any suitable information that may be used to calculate any of the preceding.

A timing thunk 56 may have a thunk identifier that identifies the timing thunk. In certain embodiments, request coordinator 46 may generate the thunk identifier when the thunk 56 is installed into a controller. In certain embodiments, a thunk 56 may already have a thunk identifier that may be used.

A timing thunk 56 may determine and/or record timing information in any suitable manner. In certain embodiments, timing thunk 56 of controller 54 detects start and stop times and creates one or more timing records of the times. For example, timing thunk 56 detects a stop time by intercepting a call to controller 54. Timing thunk 56 may create a timing record that may include the time of the call and a timing thunk identifier. Timing thunk 56 may create another timing record that may include the stop time and/or the elapsed time from the start time to the stop time. This timing record may also include, for example, a session identifier identifying the client session. The timing thunk may pass this timing record to monitoring buffer 58 for temporary storage. Monitoring buffer 58 may store timing records. In certain embodiments, timing records for one client session or more than one client session may be stored.

Different controllers 54 may use the same or different timing thunks 56. Different timing thunks 56 may be used if the time to interactivity is measured in different ways. For example, the stop time may be when a call is made or when a particular graphical element is displayed.

Server 28 receives timing records from client system 22. In certain embodiments, server 28 may post-process the timing records, which may, for example, reduce the number of and/or improve the accuracy of the records. Examples of post-processing are described in more detail with reference to FIG. 4. View map 42 may be used to post-process the timing records. View map 42 may include a hierarchy 52 and/or a mapping of thunk identifiers to views 50. Monitoring store 44 may store timing records, which may or may not be post-processed. Monitoring store 44 may be a relational database of timing results.

Figure 4:
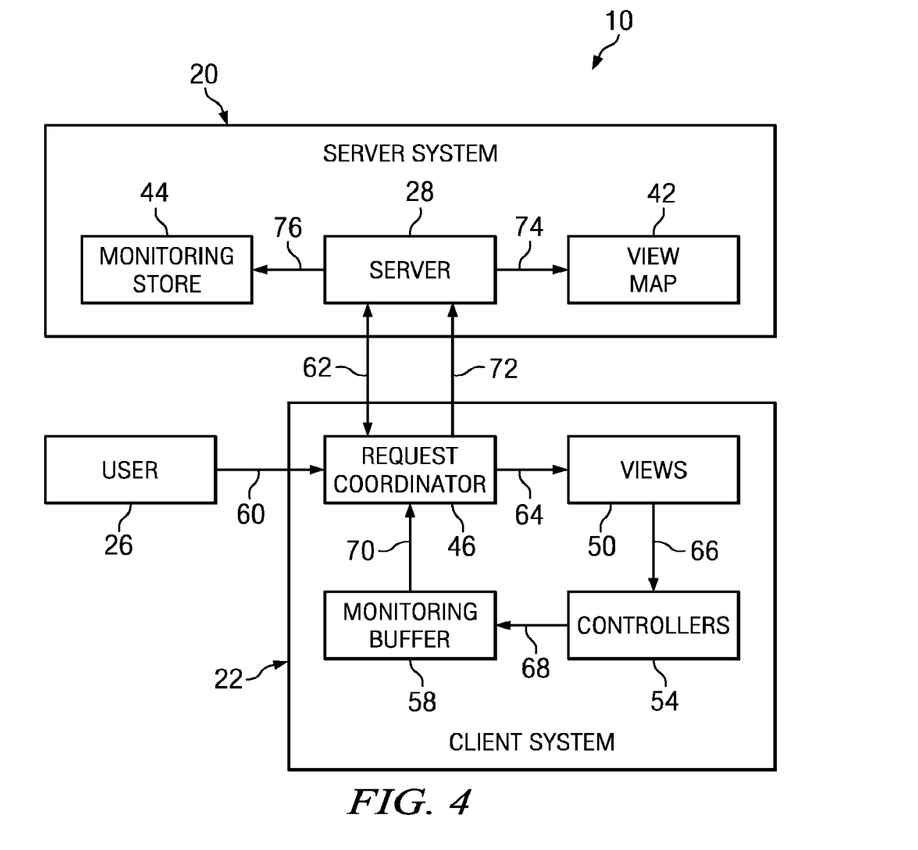
FIG. 4 illustrates an example of a method of providing timing records that may be performed by the client system and server system of FIG. 1.

FIG. 4 illustrates an example of a method of providing timing records associated with a time to interactivity of a web application. In the example, a user interacts with a web application that has view 50 displayed on display 31.

User input requesting an action involving one or more views 50 is detected at step 60. For example, the user may provide input into an input device to select a graphical element to request the action. The user input may initiate a start time for the time of interactivity. Request coordinator 46 exchanges data with server 28 to retrieve resources at step 62 to fulfill the request. For example, request coordinator 46 may request script files, images, and/or other resources responsive to the request.

Timing thunks 56 are inserted into selected controllers 54 at step 64. Timing thunks 56 may be inserted in any suitable manner. In certain embodiments, request coordinator 46 selects one or more views 50 according to hierarchy 52 of parent-child relationships among the views 50. For each view 50, a controller 54 associated with rendering of the view 50 is identified using, for example, hierarchy 52. Timing thunks 56 are installed into the identified controllers 54.

Views 50 may be selected according to hierarchy 52 in any suitable manner. In certain embodiments, request coordinator 46 selects views 50 that are initially displayed on display 31, for example, displayed without having the user scroll to another view 50 or portion of a view 50. Request coordinator 46 may refrain from installing a timing thunk 56 into a controller 54 that renders a view 50 that is not initially displayed. In the example of FIG. 2, View 1.3.2 is not initially displayed, so request coordinator 46 may refrain from installing a timing thunk 56 into a Controller E of View 1.3.2.

A timing thunk 56 used for a controller 54 may be determined in any suitable manner. In certain embodiments, request coordinator 46 determines a controller type of a controller 54 and selects a timing thunk for the controller 54 from a library of timing thunks 56 based on the controller type. For example, a GraphControllerThunk may be selected for a GraphController. The controller type may be determined in any suitable manner. For example, request coordinator 46 may determine the controller type from the code of controller 54, or request coordinator 46 may ask controller 54 to send its control type to request coordinator 46.

A timing thunk 56 may be installed into a controller 54 in any suitable manner. In certain embodiments, request coordinator 46 redefines a method on controller 54 to intercept a call to the method, obtain the timing event, and return control to the method. For example, a GraphControllerThunk may be installed by dynamically redefining a method on a GraphController object to allow the object to intercept a specific method call to the object, obtain the timing event, and then return control to the original method of the GraphController object. In certain embodiments, request coordinator 46 replaces at least a portion of the controller with a replacement portion configured to obtain the timing event.

A call to a controller may be intercepted by a timing thunk 56 at step 66. The call may be regarded as a stop time, and timing thunk 56 may create a timing record of the intercepted call. The timing record may include any suitable information. For example, the timing record may include a timing thunk identifier and/or a timing sample of when the call to the controller occurred.

Timing records are stored by monitoring buffer 58 at step 68. In certain embodiments, monitoring buffer 58 may reduce the number of timing records. In some cases, monitoring buffer 58 may generate one or more replacement timing records that summarize the collected timing records. Monitoring buffer 58 may locate records containing the same identifier(s) (e.g., session identifier and/or timing identifier). In certain embodiments, monitoring buffer 58 may apply a elapsed time function to the elapsed times of the records to yield a replacement elapsed time and replace the records with a timing record that has the replacement elapsed time. The elapsed time function may be a statistical function such as an average, median (50th percentile), or other percentile function (e.g., 90th percentile).

In one example, monitoring buffer 58 may contain a first record R1 {session 1, identifier 1, 30 ms} and a second record R2 {session 1, identifier 1, 50 ms}. The monitoring buffer may replace the first and second records with a first replacement record RR1 {session 1, identifier 1, 40 ms, 2 samples} comprising an average elapsed time of the samples. A third record R3 {session 1, identifier 1, 70 ms} may be added later to monitoring buffer 58. Monitoring buffer 58 may then replace the third record R3 and first replacement record RR1 with a second replacement record RR2 {session 1, identifier 1, 50 ms, 3 samples}. The first replacement record RR1 may be weighted twice as much as the third record R3 to reflect the number of samples. In another example, monitoring buffer 58 may replace the records R1, R2, and R3 with a replacement record {session 1, identifier 1, 50 ms} that includes a median of the elapsed times.

In certain embodiments, the elapsed time function may decimate the input times such that x out of y records are discarded, where x<y, for example, x=2 and y=3. For example, monitoring buffer 58 may replace records R1, R2, and R3 with a replacement record that is R3 {session 1, identifier 1, 70 ms}, basically using record R3 and discarding records R1 and R2.

Other factors affect the collection of timing records. For example, monitoring buffer 58 may be of a fixed size, so older records may be discarded. As another example, records may be collected at a fixed rate of a maximum number of records per second. As another example, records during a user startup period may be collected. The user startup period may have a value in any suitable range, for example, less than five seconds, five to ten seconds, or ten to twelve seconds. After the user startup period, fewer or no records may be collected.

Monitoring buffer 58 reports the timing records to request coordinator 46 at step 70. Monitoring buffer 58 may report the timing records in any suitable manner. In certain embodiments, monitoring buffer 58 periodically batches one or more timing records for submission to request coordinator 46. For example, monitoring buffer 58 may dequeue some or all of the accumulated timing records and construct a batch message. Monitoring buffer 58 may also reduce the number of timing records as described above. Monitoring buffer 58 may batch the timing records according to one or more identifiers (e.g., session identifier and/or timing identifier). Monitoring buffer 58 may promote a shared element to be a property specified by the batch rather than specified by each timing record.

Request coordinator 46 transmits the timing records to server 28 at step 72. In certain embodiments, request coordinator 46 may format a batch of timing records as a web service message and transmit the message to server 28 by making an HTTP request.

Request coordinator 46 may perform operations that may improve efficiency. In certain embodiments, request coordinator 46 may aggregate batches of timing records. In other embodiments, request coordinator 46 may piggyback transmission of timing records on an application message. For example, request coordinator 46 may wait for the next time client system 22 makes an application request to server 28, formulate a composite message comprising the application request and the batch message, and transmit the composite message to server 28. The composite message may be, for example, a multipart-MIME message. Server 28 may then split the composite message back into the application message and the batch message, deliver the application message to the application, and then process the batch message. In certain embodiments, request coordinator 46 may start a timer when a batch of timing records is ready. Request coordinator 46 may use the piggyback approach if an application message is sent prior to expiration of the timer, or directly transmit the batch of timing records if no application message is sent prior to expiration.

Server 28 post-processes the timing records at step 76. The timing records may be post-processed in any suitable manner. In certain embodiments, server 28 may unpack the timing records of a batch. Server 28 may determine the timing identifier of a timing record, and perform a lookup on view map 42 to find view 50 corresponding to the timing identifier. Server 28 may discard timing records corresponding to views 50 or portions of views 50 that are not in the identified set of views 50.

Server 28 may adjust the elapsed times, which may improve the accuracy of the elapsed times. In certain embodiments, server 28 determines a controller type of a controller 54 associated with an elapsed time, and applies an adjustment factor corresponding to the controller type to the elapsed time. For example, a Graph Controller view may be rendered x milliseconds (ms) after a call is made to a GraphController. Server 28 may add x ms as an adjustment factor to the elapsed time for the view. The controller type for the timing identifier may be indicated by view map 42.

In other embodiments, server 28 may determine the adjustment factor based on hierarchy 52 of parent-child view relationships. For example, View A has a child View B, and View A is not interactable until child View B has been fully rendered. View B has an elapsed time of y ms, and View A has an elapsed time of z ins. Server 28 may apply a function to elapsed times y and z to determine an adjustment factor for the elapsed time of View A. For example, server 28 may apply a maximum function max{y,z} to select the greater of y and z as the elapsed time of View A. Server 28 records the post-processed timing results in monitoring store 44 at step 76.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of web browser 45 and request coordinator 46 may be performed by one component, or the operations of request coordinator 46 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

In certain embodiments, an entity that performs a first step that precedes (such as leads to) a second step may be regarded as facilitating the second step. For example, if an entity performs step A that precedes step B, the entity also facilitates step B. In certain embodiments, a first entity that performs a first step that precedes a second step that may be performed by a second entity may be regarded as allowing the second entity to perform the second step. For example, if a first entity performs step A that precedes step B that may be performed by a second entity, the first entity also allows the second entity to perform step B.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor (or processing unit) include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network (for example, communication network 24). A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method, comprising:
    installing instructions into a computer program configured to render a view that includes a plurality of views that have a hierarchical relationship, the instructions configured to collect one or more timing events associated with a rendering of the view;
    receiving, from a computing device, a user input to a graphical user interface of the computer program that requests one or more actions associated with the view;
    determining individual views of the plurality of views that are visible on a display of the computing device, wherein the individual views include a first view and a second view;
    initiating the rendering of the view using a plurality of controllers, wherein a first controller renders the first view and a second renders the second view;

generating timing information via the first controller and the second controller, wherein the timing information is related to a time between a user input to a graphical user interface that requests the one or more actions associated with the view and at least a time to interactivity with the view at which the view is operable to allow a user of the graphical user interface to interact with the view; and sending from the first controller and the second controller a configurable portion of the timing information associated with the rendering of the view to a server computing device.

2. The computer-implemented method of claim 1, wherein the rendering of the view is initiated by the computer program installed on a client computing device and wherein the timing information includes timing events associated with displaying the view a plurality of times.

3. The computer-implemented method of claim 2, further comprising determining the first controller for rendering the first view and the second controller for rendering the second view.

4. The computer-implemented method of claim 1, further comprising generating statistical data from the timing information, and wherein sending the configurable portion includes at least a portion of the statistical data.

5. The computer-implemented method of claim 1, wherein the time to interactivity is less than a time to render the view.

6. The computer-implemented method of claim 1, wherein installing the instructions comprises redefining a method on the plurality of the controllers to intercept a call to a method, obtain a timing event, and returning control to the method.

7. The computer-implemented method of claim 1, wherein installing the instructions comprises replacing at least a portion of the plurality of the controllers with a replacement portion configured to collect the one or more timing events.

8. The computer-implemented method of claim 1, wherein generating the timing information includes creating a plurality of timing records from one or more timing events; and selecting a subset of the plurality of timing records.

9. The computer-implemented method of claim 1, further comprising generating one or more replacement timing records that summarize at least a portion of the timing information.

10. A system comprising:
one or more processing units configured to:
install instructions into a computer program configured to render a view that includes a plurality of views that have a hierarchical relationship, the instructions configured to collect one or more timing events associated with a rendering of the view;
receive, from a computing device, a user input to a graphical user interface that requests one or more actions associated with the view;
determine individual views of the plurality of views that are visible on a display of the computing device, wherein the individual views include a first view and a second view;
initiate the rendering of the view using a plurality of controllers, wherein a first controller renders the first view and a second renders the second view;
create records from timing events generated by the plurality of controllers, wherein a first record of the records indicates a time to interactivity at which a user of the computer program is able to interact with the view;

generate, based at least in part on the records, statistical data representative of the timing events associated with the view; and
report the statistical data to a remote computing device.

11. The system of claim 10, wherein the one or more processing units are further configured to:
receive the computer program from the remote computing device.

12. The system of claim 10, wherein installing the instructions comprises redefining a method on a controller associated with the computer program to intercept a call to the method, obtain a timing event, and return control to the method.

13. The system of claim 10, wherein installing the instructions comprises replacing at least a portion of one or more of the plurality of the controllers associated with the computer program with a replacement portion configured to obtain a timing event.

14. The system of claim 10, wherein generating the statistical data comprises causing the one or more processing units configured to select a subset of the plurality of timing records for reporting.

15. The system of claim 10, wherein generating the statistical data comprises causing the one or more processing units to generate one or more replacement timing records that summarize at least a portion of the timing records.

16. One or more non-transitory computer-readable media comprising logic, the logic when executed by one or more processing units configured to perform operations comprising:
installing instructions into a computer program configured to render a view that includes a plurality of views that have a hierarchical relationship, the instructions configured to collect one or more timing events associated with a rendering of the view;
receiving, from a computing device, a user input to a graphical user interface that requests one or more actions associated with the view;
determining individual views of the plurality of views that are visible on a display of the computing device, wherein the individual views include a first view and a second view;
initiating the rendering of the view using a plurality of controllers, wherein a first controller renders the first view and a second renders the second view;
creating records from timing events generated by the plurality of controllers, wherein a first record of the records indicates a time to interactivity at which a user of the computer program is able to interact with the at least the partial rendering of the view;
generating, based at least in part on the records, statistical data representative of the timing events associated with the rendering of the view; and
reporting the statistical data to a remote computing device.

17. The media of claim 16, wherein the time to interactivity is less than a time to render the view.

18. The media of claim 17, wherein the first record further indicates a time lapsed between the input and a call to render the view.

19. The media of claim 16, wherein the logic further causes the one or more processing units to extract a plurality of elapsed times from the records, at least one elapsed time indicating a time to interactivity of the second view; and based at least in part on an adjustment factor associated with rendering the first view, adjusting the at least one elapsed time to yield one or more adjusted elapsed times that indicate a time to interactivity of the second view, wherein the adjustment factor is determined based upon an amount of time to render the first view.

20. The media of claim 19, the adjusting the at least one elapsed time comprises determining the adjustment factor for an elapsed time of the view according to a parent-child relationship among the view and one or more other views; and applying the adjustment factor to the elapsed time.

* * * * *